United States Patent [19]

Fabre

[11] Patent Number: 4,689,237
[45] Date of Patent: Aug. 25, 1987

[54] PROCESS FOR THE THERMAL TREATMENT OF FLUIDS

[75] Inventor: Claire Fabre, Chasselay, France

[73] Assignee: Institute National de la Recherche Agronomique, Paris, France

[21] Appl. No.: 637,212

[22] PCT Filed: Nov. 23, 1983

[86] PCT No.: PCT/FR83/00226
§ 371 Date: Jul. 13, 1984
§ 102(e) Date: Jul. 13, 1984

[87] PCT Pub. No.: WO84/02062
PCT Pub. Date: Jun. 7, 1984

[30] Foreign Application Priority Data

Nov. 24, 1982 [FR] France ............... 82 19709

[51] Int. Cl.$^4$ .......................... A23L 3/16; A23C 3/02
[52] U.S. Cl. ............................... 426/521; 99/453; 99/483; 261/76; 426/474; 426/522
[58] Field of Search ............ 426/521, 522, 511, 476, 426/474, 467; 99/453, 467, 483; 261/76, DIG. 76, DIG. 10

[56] References Cited

U.S. PATENT DOCUMENTS 2,060,557 11/1936 Davis .................................. 261/76
2,089,132 8/1937 Murray ............................. 426/476
2,115,470 4/1938 Rogers .............................. 99/61
4,161,909 7/1979 Wakeman ......................... 99/453

FOREIGN PATENT DOCUMENTS 2354527 1/1978 France .
2375900 7/1978 France .
2441344 6/1980 France .

Primary Examiner—George Yeung
Attorney, Agent, or Firm—Berman, Aisenberg & Platt

[57] ABSTRACT

A process for heating a fluid, such as a foodstuff, by passing a vapor at a high temperature and under pressure through an annular chamber extending around a perforated mixing chamber and injecting the vapor from the annular chamber into the mixing chamber perpendicularly to the fluid flowing through the mixing chamber. A stream of the fluid, vapor and vapor-fluid mixture thus obtained is passed through and out from the mixing chamber into the constricting means of an axial nozzle having a passage means. The stream is then passed through the passage means in axial extension with the constricting means for producing complete condensation of the vapor in the stream so as to increase the fluid temperature, thereby generating cavitation in the vicinity of a point of maximum constriction of the stream located inside the passage means to produce a critical flow therein. The stream existing from the passage means is conveyed into a pressure release enclosure under reduced pressure for abruptly evaporating the condensed vapor from the stream, thus separating the vapor from the stream and abruptly cooling the fluid.

10 Claims, 10 Drawing Figures

PROCESS FOR THE THERMAL TREATMENT OF FLUIDS

The present invention relates to a field of technology of processes and devices for thermal treatment of a fluid by vapor injection into this fluid.

There is a large number of vapor injection devices which are known and employed particularly for the sterilization of liquid foodstuffs. These devices generally consist of a chamber (for mixing a product with vapor, inside which chamber a part of the vapor condenses, extended by a holding section, inside which condensation is completed, resulting in a rise in temperature. The product is then cooled in a vacuum evaporation chamber in which the condensed vapor is evaporated. Maintenance of the required temperature is usually provided by regulation of the pressure of the injected vapor, controlled by a temperature measurement in the holding section.

There may be mentioned by way of example the injector described in the document FR-A-1,114,013 which permits this type of treatment and which consists of a section of straight tubing which is surrounded by a vapor jacket; this vapor enters the stream of the product to be treated, through orifices in the wall of the tubing, in the region of maximum flow velocity, the orifices for introducing vapor being inclined in the direction of the flow.

Using this treatment, in the case of foodstuffs, bacteria which are detrimental to their long preservation are destroyed without, however, changing their nutritional value or their physico-chemical characteristics. In the case of milk, for example, the heat treatment which is referred to as U.H.T. sterilization consists, after preheating, of an abrupt increase in the temperature up to 150° and of this temperature being held for several seconds. The characteristics of the heat treatment are generally prescribed by regulations for each type of product, depending on its destination. The international standards which define the treatments of pasteurization, sterilization and "U.H.T" treatment are well known to the experts.

The known systems have the following disadvantages:

1. Stability of the sterilization temperature is very difficult to produce and, in practice, considerable fluctuations around the set point are observed as soon as a flow parameter or an environmental parameter is slightly changed. The reason for this will be given later. A known remedy, described in the document FR-A-2,441,344, for reducing these considerable fluctuations in temperature consists in getting rid of the oscillations of the vapor injection by the expedient of a critical flow of this same vapor, upstream of the mixing chamber, in the entry nozzle of the injector; this arrangement provides a constant flow of vapor into the mixing chamber which, combined with a constant flow of the product to be treated, should provide good stability of the treatment.

2. Completion of the condensation in the holding section is reflected in an unevenness of the heat treatments owing to the absence of temperature uniformity within the product. Moreover, the fact that the volume occupied by the fluid is unknown makes it difficult to evaluate the residence time at high temperature.

These two disadvantages make it necessary for the sterilization conditions to be exaggerated, at the cost of the physico-chemical and organoleptic properties of the product to be treated.

In addition, the presence of a holding section, which is essential for completion of the temperature rise and for establishing a certain uniformity of the heat treatment, does not make it possible to envisage a treatment the duration of which would be less than a second.

While the device of the document FR-A-2,441,344 permits good temperature stability, it does not, however, provide satisfactory efficiency in respect of the control of the time of contact between product and vapor, and this scatter of contact times can give rise to noticeable changes in the treated product.

One of the objectives of the present invention is to ensure complete condensation of the vapor injected inside the injector.

Another objective is to provide a thermal treatment which is stable with time and does not require complex regulating systems.

Another objective is to permit thermal treatment of liquids by vapor injection for a very short time (<1s).

The present invention therefore provides a process for thermal treatment of a fluid in which vapor is injected into a chamber through which the fluid passes and which terminates in an abrupt constriction pierced by a passage which has the particular feature that, for a given fluid which is to be raised from a first temperature to a second, higher, temperature, the mass flow rate of the fluid and the cross-sections of the passage and of the mixing chamber are determined to obtain a pressure drop on passing through the passage, which pressure drop is between an excessive value (which would not make it possible to inject the quantity of vapor required for the requisite heating), and a value which is too low and which would correspond to the injection of an excessive quantity of vapor (which would not be completely condensed).

According to an advantageous method, after the mass flow rate of the fluid and the cross-sections of the passage and of the mixing chamber have been fixed, the pressure drop is held constant at its set value by varying the pressure downstream of the passage. However, according to a preferred method the mass velocity and the diameter of the passage are determined together with the operating conditions such as pressure, nature of the passage material and gas content of the fluid), to obtain a critical flow of the fluid in the passage.

Preferably, in this case, the flow of fluid through the passage being maintained in a critical regime, the set value of the pressure at which vapor is introduced into the chamber is regulated as a function of the fluid temperature after condensation of the vapor.

Also, in the same case, it is advantageous to provide for the fluid to be conveyed to a pressure-release enclosure under a reduced pressure and the fluid is made to enter the said enclosure immediately after it has passed the point where the critical flow is produced. An ultra-short treatment is thus obtained.

When no attempt is made to obtain a critical flow in the device according to the invention, it is advantageous to provide for the abrupt constriction to be formed by a conical part having an apex angle greater than approximately 30°.

When, on the contrary, the intention is to obtain a critical flow, it is advantageous to ensure simultaneously that the abrupt constriction is joined to the passage, forming with it an angle of between 60° and 120°, and that the inner surface of the passage incorporates nucleating sites.

Preferably, for the treatment of high flows, the device incorporates several nozzles arranged in parallel.

The invention is found to be particularly advantageous in the case where the fluid is a foodstuff because it makes it possible to obtain a pasteurization or sterilization treatment of a duration which is less than 1 second.

The invention will now be described in greater detail with the aid of non-limiting examples illustrated by the drawings, in which.

Figure 1:
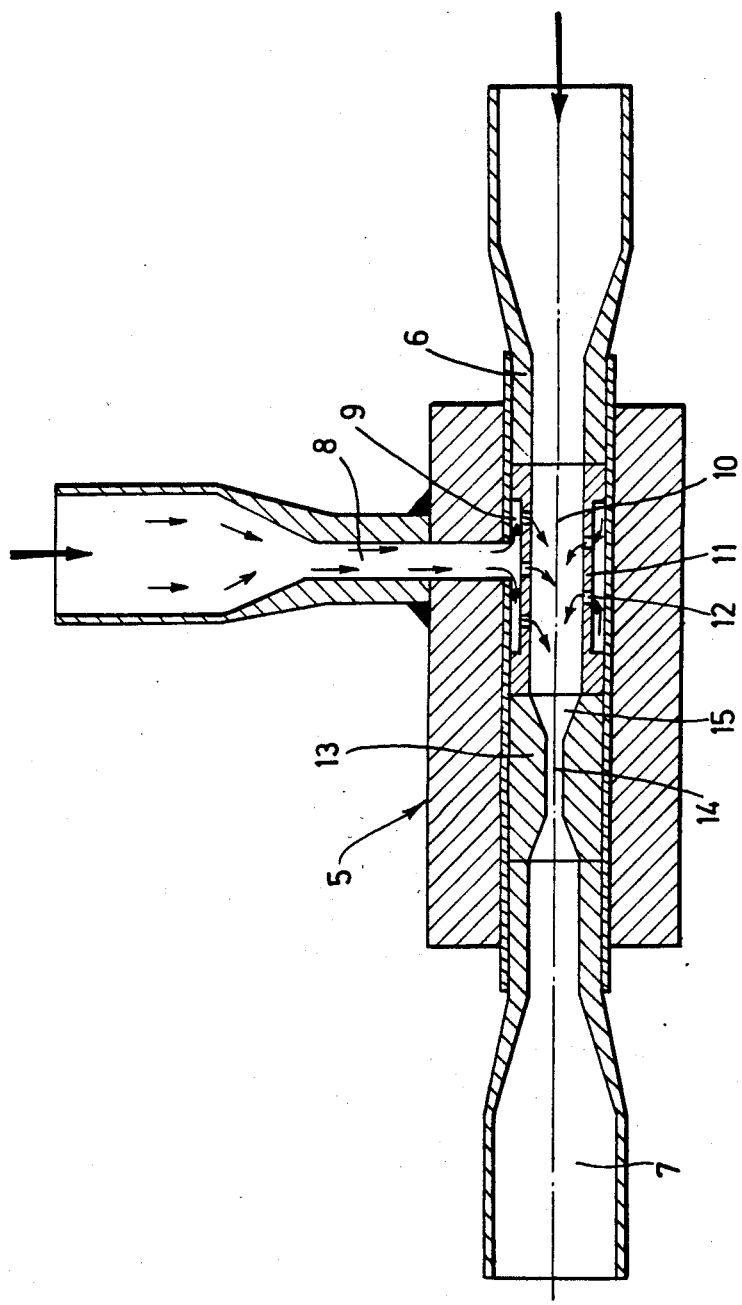
FIG. 1 is a view in longitudinal section of a device according to the invention.

FIG. 1 shows an injector which provides a vapor entry into a stream of the product to be treated. The various stated components which form the injector are capable of being disassembled to permit easy cleaning of each of the parts contacting the product to be treated. This injector 5 incorporates an inlet tube 6 for the fluid product to be treated and an outlet tube 7 situated in the axial extension of the inlet and forming part of the holding section. Vapor is delivered to the injector by a side tube 8; it first enters an annular chamber 9 around the mixing chamber 10 which is situated in the centre of the injector. The two chambers 9 and 10 are separated by a cylindrical wall 11 incorporating several vapor passage orifices 12 arranged at the rate of several over the circumferences of the wall.

The mixing chamber 10 extends from the inlet tube 6, having the same diameter, and at its end terminates in a nozzle 13, which is pierced by an axial passage 14. Nozzle 13 incorporates a convergent conical inlet part 15 which is joined at its upstream end to the walls of the chamber 10 and at its downstream end to the passage 14. Nozzle 13 is symmetrical; its downstream part has the same shape as its upstream part, and is joined in the same manner to the outlet tube. The apex angle of the conical part 15 is of some importance because it must be at least equal to approximately 30° (that is to say that in cross-section, the wall makes an angle which is equal to at least 15° with the axis). Preferably, this angle is 60°±15°, but it may go up to 90° and over.

This conical part forms the abrupt constriction to which reference was made earlier. The cross-sections of the chamber 10 and of the passage 14 must be chosen as a function of the operating conditions and of the objective sought after. By way of non-restrictive information it may be mentioned that satisfactory trials have been carried out for flows of approximately 150 kg/hour with chamber and nozzle diameters of respectively 9 mm and 2.3 mm, that is a ratio of cross-sections of approximately 11. The length of the passage 14 may vary within wide limits but it is preferable that it should be greater than its diameter.

During operation, the vapor pressure in the chamber 9 is slightly above the pressure in the product to be treated at the inlet of the mixing chamber 10. Vapor enters the perpendicular fluid stream and mixes with the product before entering the abrupt constriction formed by the conical part 15. This abrupt constriction forces the vapor to condense before entering the nozzle.

Figure 2:
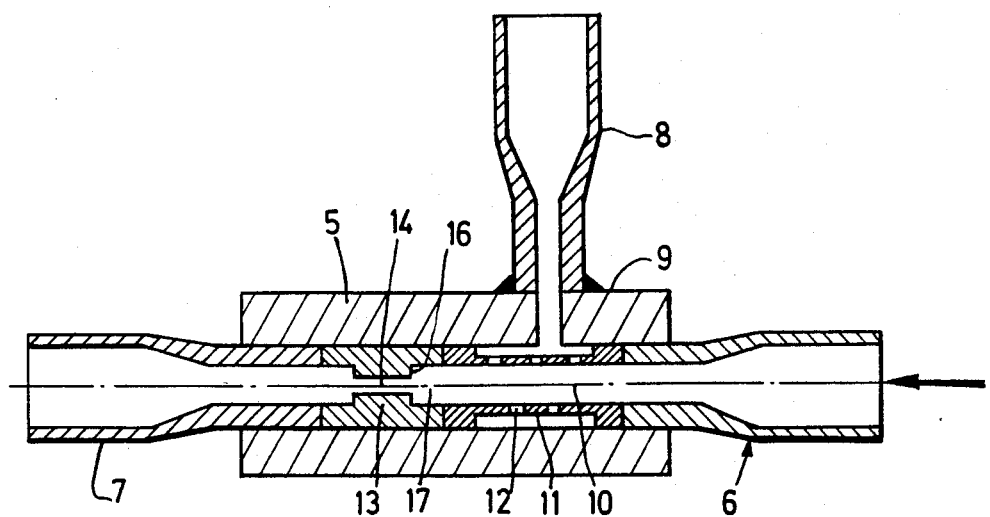
FIG. 2 is a similar view of another device according to the invention.

FIG. 2 relates to an apparatus which is closely similar in appearance to that of FIG. 1, but its operation is, nevertheless, very different. In both figures the same parts bear the same references.

The difference between the two devices lies essentially in the shape of the nozzle 13 which is provided with passage 14. Upstream of the passage, this component incorporates not a conical part but a transverse planar surface 16 which forms a right angle with a cylindrical part 17 which extends the walls of the chamber 10 without a change of cross-section. The surface 16 also forms a right angle with the inner surface of the passage 14. In fact, the transverse surface 16 need not necessarily be planar, but it may be conical with a very large apex angle, for example between 160° and 200°. With such a device, and when the conditions are otherwise suitable, there is produced, in the region of the passage, a critical flow corresponding to the appearance of the cavitation phenomenon in the vicinity of the point of maximum contraction of the fluid stream, this point being located in the passage, at a small distance from its intersection with the transverse surface 16.

The practical data for the production of a complete vapor condensation (in the case of FIGS. 1 and 2) and a critical flow (in the case of FIG. 2) are given below.

CONDENSATION CONDITIONS

The choice of the passage diameter, all other parameters being fixed, is arrived at by a compromise.

If this diameter is too large, too much vapor is injected and/or poor condensation takes place.

If it is too narrow, not enough vapor is injected and/or there is a pressure drop which is too high for the pressure in the holding section to be above the saturation vapor pressure. An example of condensation in a non-critical regime is:

fluid: water
mass flow: m=140 kg/h
initial temperature $0_o=70°$ C.
final temperature $0_{o1}=140°$ C.

A suitable result was obtained with d=2.3 mm and d/D=0.26, d being the diameter of the passage and D that of the chamber.

The pressure drop in the passage determines the amount of vapor injected if the liquid flow is imposed. The abrupt constriction promotes turbulence and increases the area of contact between the product and vapor.

CRITICAL REGIME CONDITIONS

The critical regime is characterised by a maximum flow which cannot be exceeded. When these conditions are established, the parameters of the flow upstream and downstream of a nozzle section called a critical section are independent.

Figure 7:
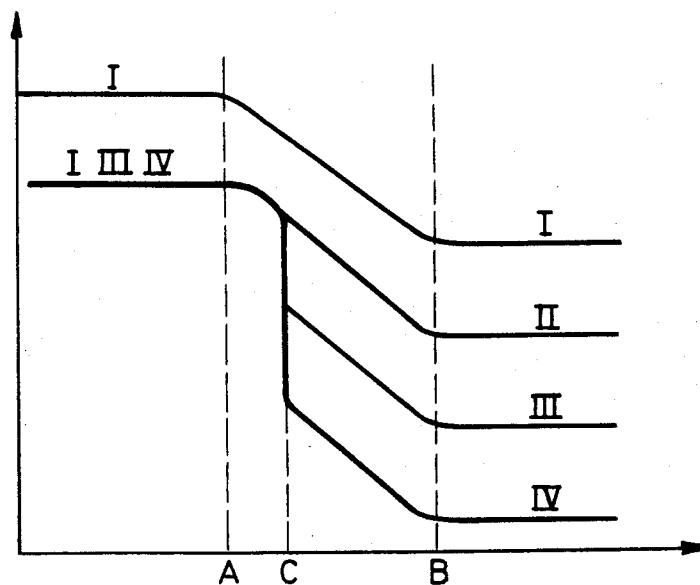
FIG. 7 is a graph illustrating the variation in pressure along the device for various regimes.

FIG. 7 illustrates the difference between the critical flow regimes and other regimes. In this figure, four curves show the variation in pressure in the passage (part AB) and on either side of its, for different regimes corresponding to various upstream and downstream pressures and for the same flow rate.

Curve I corresponds to relatively high upstream and downstream pressures without a critical regime.

The pressure is substantially constant upstream of the passage, diminishes in the passage and attains the value of the downstream pressure at the exit of the passage.

Curve II corresponds to a lower pair of upstream and downstream pressures, but at the limit of the critical regime. It is found that the curves I and II are nearly parallel.

Curve III corresponds to an upstream pressure equal to that of curve II, but to a lower downstream pressure, with the appearance of a critical regime at a point C in the nozzle. At point C there is observed a sudden drop in pressure which then comes into line with the downstream pressure.

Curve IV corresponds to a downstream pressure which is lower than that of curve III.

A complete independence of the flows is found between the regimes situated upstream and downstream of point C as soon as a critical regime makes its appearance. It will be noted that the position of point C is not fixed in the passage and depends on the operating conditions.

If, in a critical regime, the downstream pressure bears no relation to the upstream pressure, it also bears no relation to the vapor flow rate and hence to the temperature rise caused by this flow rate. It then immediately becomes possible to envisage treatments involving intense heating of very short duration.

CONDITIONS WHICH MUST BE PRODUCED IN THE DEVICE TO OBTAIN A CRITICAL REGIME

The pressure must be lowered inside the nozzle, below the saturation vapor pressure due to the effect of the abrupt constriction and, if appropriate, friction.

A number of nucleation sites must exist on the inner surface of the passage 14, permitting adequate development of cavitation (pockets, bubbles, film and the like).

Possible presence of dissolved gas in the product to be treated and capable of degassing.

These three conditions must be combined to produce, in a critical section, a two-phase medium permitting the interaction.

Among the factors which influence the production of these conditions are
- the nature of the product to be treated
- the mass velocity G equal to the ratio (mass flow rate)/(cross-section of the passage)
- the upstream pressure
- the ratios L/s and s/S, L and s respectively denoting the length and the cross-section of the passage 14 and S the cross-section before the constriction.
- the condition of the inner surface of the passage this surface condition depending particularly on the material of which the component 13 is made (stainless steel, for example, has been found advantageous in the presence of aqueous liquids) and the nature and the technique of machining employed to produce the passage 14.

By making adjustments to all these parameters, it is possible to attain the critical regime under varied conditions.

For example, in the case of water with a stainless steel nozzle, critical regimes have been produced under the following conditions, the shape of the device corresponding to FIG. 2:

d/D=0.2; L/d in the range 1.1 to 5.6, d=1.8 mm, temperature: 20° C., upstream pressure: 5 bars, G=20,000 kgm$^{-2}$ s$^{-1}$ Critical regimes have also been obtained under the following conditions:

d/D=0.26; L/d=4.4; d=2.3 mm, temperature: 140° C., upstream pressure: 10 bars, G=10.360 kg m$^{-2}$ s$^{-1}$.

Figure 8:
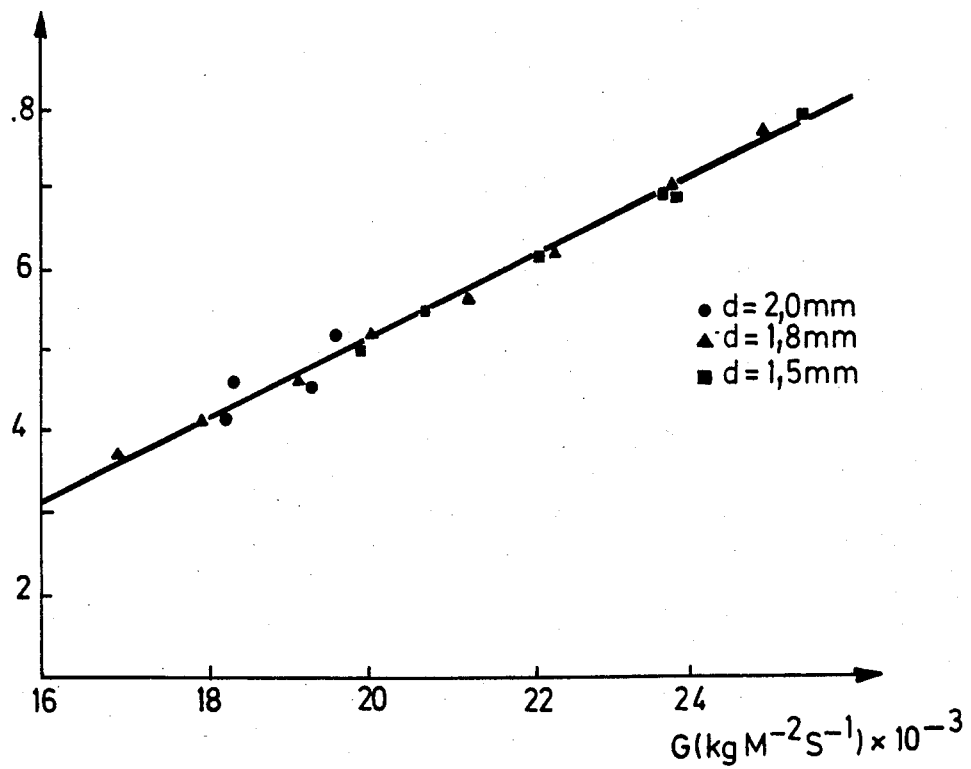
FIG. 8 is a graph illustrating the relationships between the critical upstream pressure and the mass flow.

FIG. 8 shows the relationship between the "critical" upstream pressure, that is to say that pressure below which it is not possible to descend for the mass velocity in the given passage and this mass velocity for various values of the diameter d of the passage 14, the remaining parameters being unchanged; nature and temperature of the fluid (water at 70° C.), condition of the passage surface (stainless steel), diameter of the chamber 10 (90 mm). It is found that there is a correlation between the mass velocity and the critical upstream pressure, which makes it possible to determine the characteristics of an equipment from a small number of tests.

Figure 9:
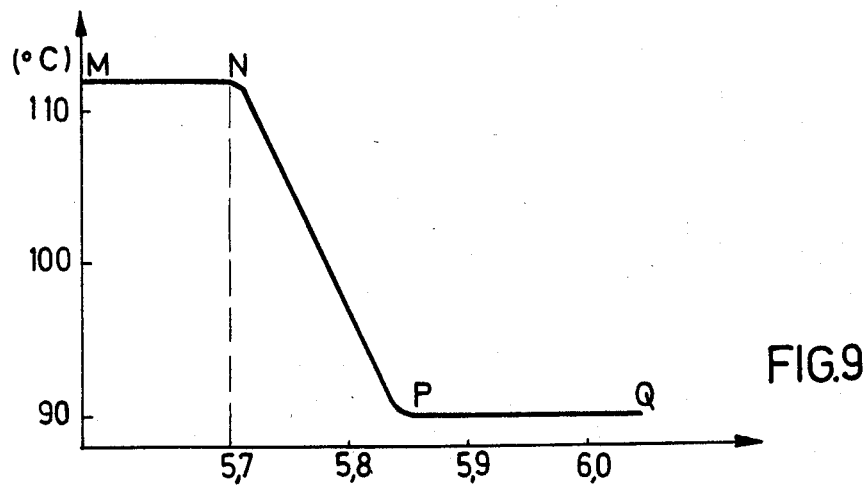
FIG. 9 is a graph showing the relationships between the temperature reached and the downstream pressure.

FIG. 9 shows the relationship between the temperature reached in an equipment similar to FIG. 2, as a function of the downstream pressure, under the following conditions:

fluid: water, flow rate: 0.123 m$^3$/h, d=2 mm, L=10 mm, D=90 mm, upstream pressure=6.7 bars, Fluid temperature at the inlet of the chamber 10: 90° C.

The figure shows that, for low downstream pressures (sections MN), the temperature attained is high and independent of the downstream pressure. The conditions are then those of a critical regime, and the downstream pressure has no influence on what happens upstream, as was said earlier. The temperature attained depends only on the vapor injection pressure, which is constant in the experiment.

FIG. 9 then shows a region where the temperature decreases rapidly when the downstream pressure increases (section NP). This situation corresponds to non-critical regimes, and any increase in downstream pressure reduces the quantity of vapor which can be injected, and hence the obtainable temperature rise.

Finally, FIG. 9 shows a region where the temperature attained in equal to the inlet temperature (section PQ). This corresponds to the fact that, the downstream pressure being too high, there is an overpressure upstream which no longer makes it possible to inject vapor into the fluid and the temperature of the latter is consequently unchanged.

When operating under the conditions corresponding to non-critical regimes (section NP of the curve in FIG. 9), it is advantageous to regulate the downstream pressure accurately.

Figure 5:
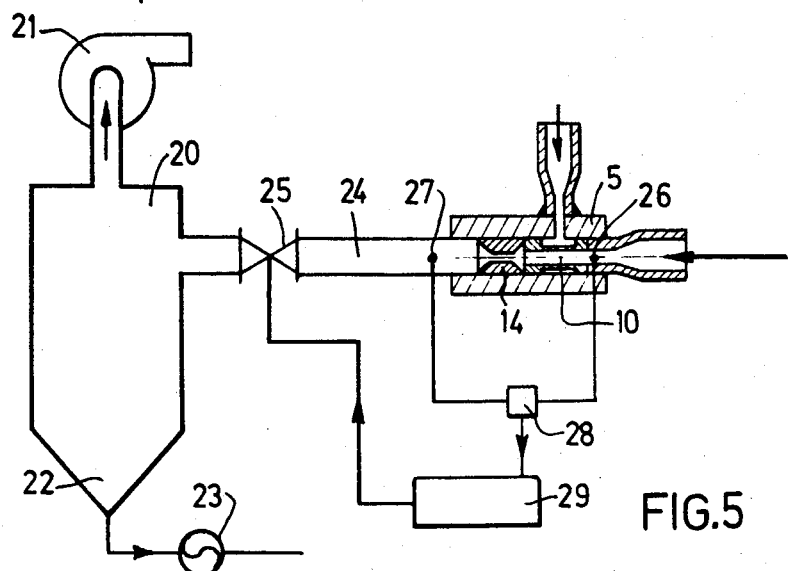
FIG. 5 is a control diagram.

This may be achieved, for example, with the assembly shown diagrammatically in FIG. 5.

In this figure, apart from the device 5, which may be of the type shown in FIG. 1, there is shown a vacuum chamber 20, connected to a vacuum pump 21, and in which the fluid is subjected to a pressure release before being collected in the lower part 22 and removed by a discharge pump 23. The downstream part of the device 5 is connected to the chamber 20 by a conduit 24 in which a proportionalaction valve 25 is inserted. Two pressure sensors 26, 27 located respectively upstream of the passage 14, for example in the chamber 10, and downstream of this passage, are connected to a device 28 which transmits signals corresponding to the pressure difference between these two sensors, that is to say to the pressure drop in the passage 14. These signals are transmitted to a regulating device 29 which, in its turn, controls the opening or the closing of the valve 25. It is known that the temperature attained is a function of the downstream pressure, as can be seen in FIG. 9. An accidental fluctuation in the upstream pressure (for example a change in the vapor pressure) acts on the load part. It is compensated, by virtue of the system described, by a change in the downstream pressure.

Figure 3:
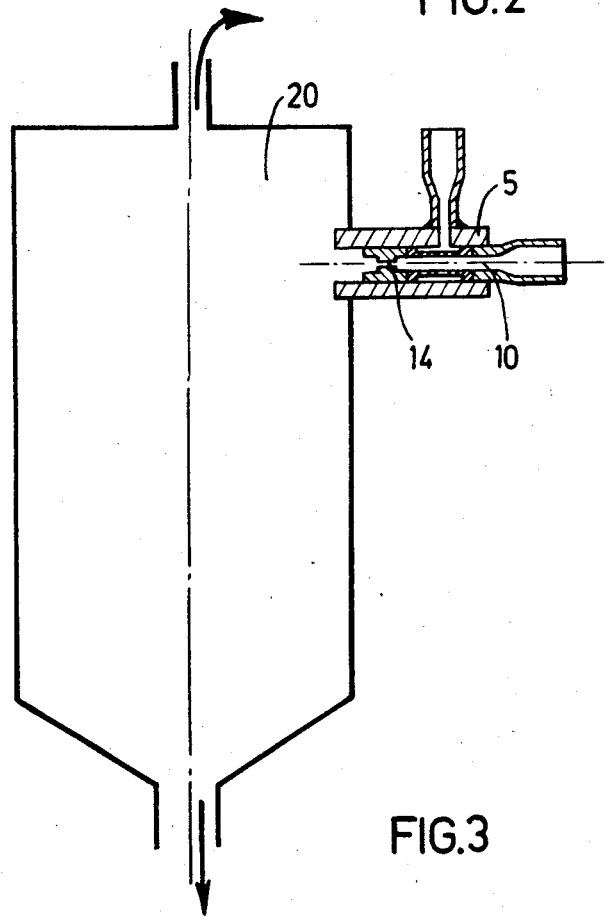
FIG. 3 is a diagrammatic view of a unit fitted with a device according to FIG. 2.

FIG. 3 relates to a method of fitting the injector shown in FIG. 2. The outlet of the injector 5 opens directly into the vacuum chamber 20, subjecting the exit of the passage 14 to the reduced pressure in the evaporator, so that the high temperature heat treatment ends in the region of the critical threshold. The partial vacuum in the chamber 20, which forms an evaporator ensuring the separation of vapor from the product, acts directly on the fluid stream after the critical threshold. This arrangement ensures a very abrupt and well-controlled cooling of the product which was heated in the chamber 10. It is therefore particularly appropriate for treatments in which the product is subjected to a very intense rise in temperature for a very short time.

Figure 4:
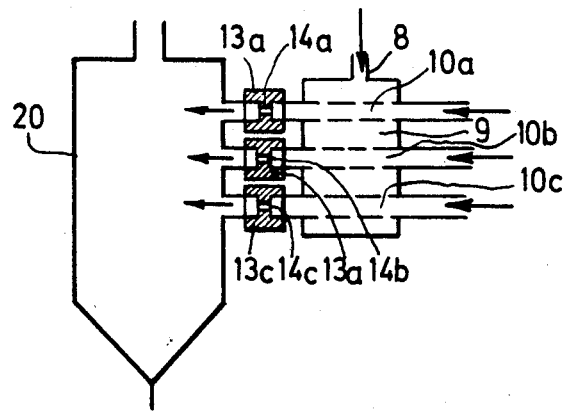
FIG. 4 is a diagrammatic view of another unit fitted with a device according to the invention.

FIG. 4 relates to a plant intended for handling high throughputs. As was said earlier, the production of the requisite conditions depends both on the values of s (cross-section of the passage) and the ratio s/S, S being the cross-section before the construction. This demonstrates that it is not possible simply to disregard the effects of scale, and that, in certain cases, it is impossible to produce, at high throughputs, the results corresponding to lower flow rates by a simple change in the operating parameters. In this case, there is provided a series of nozzles 13a, 13b, 13c, and so on, equipped with passages 14a, 14b, 14c, and so on, arranged in parallel, each between its chamber 10a, 10b, 10c and a common vacuum chamber 20 or a holding section which is common or otherwise.

Advantageously, the vapor delivery pipe 8 and the annular chamber 9 surrounding the chambers 10a, 10b, 10c are common. Each injector may have its own control. The nozzles 13a, 13b, 13c may be of the type in FIG. 1 (without a critical regime) or that in FIG. 2 (with a critical regime).

Figure 6:
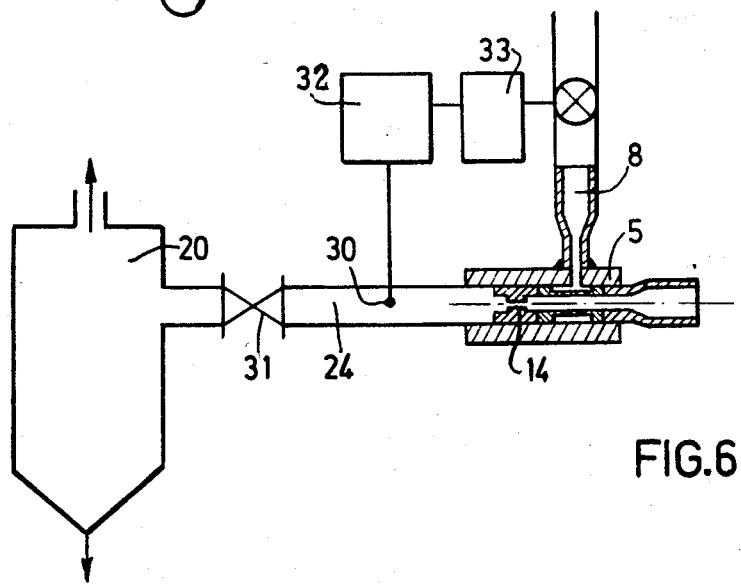
FIG. 6 is another control diagram.

FIG. 6 relates to an improvement in the device according to which operation takes place with a critical regime. As said earlier, such a device makes it possible to obtain operating conditions which are remarkably stable. The equipment described has made it possible, for example, to obtain constancy of the temperature attained such that the standard deviation of the latter amounted to only 0.04° C. (measurements at second intervals over 2 minutes). It is possible, however, to improve the performance further. For this purpose, a temperature sensor 30 is placed on the conduit 24 leading from the exit of the passage 14 to the vacuum chamber 20. A fixed opening valve or a valve with an opening diaphragm 31 is placed downstream of the sensor 30 so that the temperature indicated by the latter is independent of the conditions in the chamber 20. The signals of the sensor 30 are transmitted to a control device 32 which determines the set value of the pressure of vapor entering the device. It is obvious that a conventional control device 33 maintains the actual pressure in the vicinity of the set value. The control device and the device 32 may, of course, form part of the same electronic system.

In this way, freedom is provided from the consequences of a derivative of the critical conditions, even over extended periods.

Among the advantages of the invention which has just been described, the following may be mentioned:

complete condensation in the injector permits a uniform distribution of the temperatures in the holding section and, consequently there is no longer any need for overestimating the holding time;

the critical regime results in simplified control and the possibility of operating with very short times;

the passage with a small diameter results in the speed in the passage being of the order of 20 m/s. This high speed prevents fouling. For example, it has been possible to obtain operating periods of two hours with milk close to boiling point, or well above the latter, without any fouling. In fact, in a critical regime, far from fouling taking place, the cavitation causes erosion of the passage. It is therefore advantageous to design this component in a material which resists wear, while providing a sufficient number of nucleation sites. Stainless steel has produced good results. It should be noted that the arrangement of the injector, which consists of a small number of components and is easily capable of disassembly, facilitates the replacement of the nozzle 13 which incorporates the passage, which is the only component to wear out. This component is, moreover, small in size and simple to machine so that its price is moderate.

One of the most attractive applications of the process and devices according to the invention lies in the treatment of food products such as, in particular, milk, but also fruit juices and the like.

Figure 10:
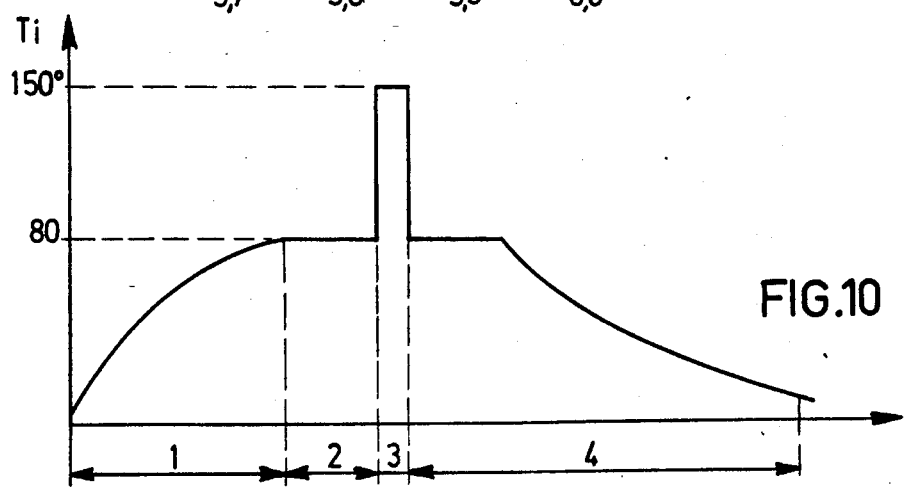
FIG. 10 is a graph showing the temperature variations in the treatment of a foodstuff.

The curve shown in FIG. 10 illustrates the conventional treatment applied to a product such as milk in the case of U.H.T. sterilization. The milk undergoes a preheating 1 which takes it to a temperature of 50° to 80°, then a preliminary holding 2 before being introduced into the mixing chamber of the injector where the vapor under pressure enters; this mixture with the vapor causes an instantaneous rise in temperature up to 140°–150°. The holding 3 of the product at this high temperature lasts for the minimum time required to destroy the germs; the holding 3 ends in a flash evaporation which brings the product back to a temperature of 50° to 80° before it enters the final cooling stage 4.

The complete condensation at the outlet of the injector according to the invention permits a homogeneous temperature in the "holding section" (part situated between the nozzle 14 and the vacuum chamber 20) and an accurate adjustment of the holding period.

The production of the critical regime permits a very high stability in temperature. It is possible, therefore, to eliminate all systems for regulating the sterilization temperature. Open-loop control of the vapor pressure before the injection is sufficient with, where appropriate, servocontrol of the vapor pressure set point as a function of the temperature in the holding section where one of these is fitted.

In the processing of all the delicate products, particularly those containing proteins and which are employed in, apart from the food industry, the pharmaceutical industry and the manufacture of cosmetics, the process of the invention makes it possible to obtain results which had not been attained hitherto. For example, by operating in a critical regime, with the passage outlet opening directly into the vacuum chamber, treatments for 0.06 s at 160° C. or 0.005 s at 170° C. can be carried out in the case of milk. It is also possible to carry out "instantaneous" pasteurization at 90° C. anticipated by the legislation but not achieved hitherto.

I claim:

1. A process for abruptly increasing fluid temperature from a first to a second temperature, maintaining the fluid temperature at substantially the second temperature for a short period of time and abruptly decreasing the fluid temperature well below said second temperature, comprising:
   (a) passing a fluid at the first temperature and at a predetermined fluid inlet mass flow rate and fluid inlet pressure into and axially through a perforated mixing chamber and into a constricting means of an axial nozzle having a passage means
   (b) passing a vapor through an annular chamber extending around said mixing chamber and injecting said vapor from said annular chamber into said mixing chamber perpendicularly to said fluid flow in said mixing chamber, at an inlet temperature superior to said second temperature, at a vapor inlet mass flow rate and at a vapor inlet pressure superior to the fluid inlet mass flow rate and the fluid inlet pressure, respectively, at least partially mixing the vapor with the fluid and at least partially condensing said vapor so as to raise said fluid temperature from said first temperature,
   (c) passing a stream of said fluid, said vapor and the vapor-fluid mixture thus obtained, at a mass flow rate corresponding to the sum of said fluid and vapor mass flow rates, through and out from said mixing chamber, into said constricting means and then through said passage means in axial extension with said constricting means for producing complete condensation of said vapor in said stream entering said passage means so as to increase said fluid temperature up to said second temperature, thereby generating cavitation in the vicinity of a point of maximum constriction of said stream located inside said passage means to produce a critical flow therein, and
   (d) conveying said stream exiting from said passage means into a pressure release enclosure under reduced pressure for abruptly evaporating said condensed vapor from said stream, thus separating said vapor from said stream and abruptly cooling said fluid.

2. A process according to claim 1, which further comprises providing an inner surface of said passage means with nucleation sites for permitting development of cavitation.

3. A process according to claim 1 which comprises conveying said stream exiting from said passage means directly into said pressure release enclosure under reduced pressure for subjecting said stream to said reduced pressure so as to obtain a substantially instantaneous cooling of said fluid.

4. A process according to claim 2 which comprises conveying said stream exiting from said passage means directly into said pressure release enclosure under reduced pressure for subjecting said stream to said reduced pressure so as to obtain a substantially instantaneous cooling of said fluid.

5. A process according to claim 1, which comprises maintaining the passage of said stream through said passage means in a critical flow and introducing said vapor into said mixing chamber at a set vapor inlet pressure value which is regulated as a function of stream temperature measured after complete condensation of said vapor.

6. A process according to claim 2, which comprises maintaining the passage of said stream through said passage means in a critical flow and introducing said vapor into said mixing chamber at a set vapor inlet pressure value which is regulated as a function of stream temperature measured after complete condensation of said vapor.

7. A pressure according to claim 5 which comprises passing said stream exiting from said passage means through a holding section in axial extension with said passage means for holding said stream at said second temperature for said short time period and through a fixed opening valve before entering said stream into said pressure release enclosure, and measuring said stream temperature between said passage means and said fixed opening valve.

8. A process according to claim 6 which comprises passing said stream exiting from said passage means through a holding section in axial extension with said passage means for holding said stream at said second temperature for said short time period and through a fixed opening valve before entering said stream into said pressure release enclosure, and measuring said stream temperature between said passage means and said fixed opening valve.

9. A process according to one of claims 1, 2 to 8 wherein said vapor is injected into several perforated mixing chambers arranged in parallel and each of which is fed with said fluid and in communication with a respective one of several constricting means and passage means communicating all with a common pressure release enclosure under reduced pressure.

10. A process according to claim 9 wherein said fluid is a liquid foodstuff and the heat treatment is one of a pasteurization and a sterilization treatment of a duration of less than 1 second.

* * * * *